(12) United States Patent
Mukaijima et al.

(10) Patent No.: US 6,738,221 B1
(45) Date of Patent: May 18, 2004

(54) MAGNETIC RECORDING UNIT WITH LID (75) Inventors: Katsutoshi Mukaijima, Tokyo (JP); Maki Wakita, Saitama (JP); Shoji Takahashi, Saitama (JP)

(73) Assignee: Iomega Corporation, San Diego, CA (US)

(*) Notice: Subject to any disclaimer, the term of this patent is extended or adjusted under 35 U.S.C. 154(b) by 0 days.

(21) Appl. No.: 09/424,178

(22) PCT Filed: Mar. 19, 1999

(86) PCT No.: PCT/JP99/01414
§ 371 (c)(1),
(2), (4) Date: Feb. 17, 2000

(87) PCT Pub. No.: WO99/49466
PCT Pub. Date: Sep. 30, 1999

(30) Foreign Application Priority Data

Mar. 20, 1998 (JP) .............................................. 8-71589
Nov. 18, 1998 (JP) ............................................ 8-343644

(51) Int. Cl.[7] .............................................. G11B 17/04
(52) U.S. Cl. .................................. 360/99.02; 360/99.06
(58) Field of Search .................... 360/97.01, 99.02, 360/99.06

(56) References Cited

U.S. PATENT DOCUMENTS

| | | | | |
|---|---|---|---|---|
| 4,754,471 A | * | 6/1988 | Dieterlen ................... | 369/77.1 |
| 4,785,365 A | * | 11/1988 | Ohkita ...................... | 360/96.5 |
| 5,109,310 A | * | 4/1992 | Ohkjita et al. ........... | 360/256.3 |
| 5,229,987 A | * | 7/1993 | Aoki ....................... | 360/97.02 |
| 5,408,459 A | * | 4/1995 | Kawaguchi et al. ..... | 360/97.02 |
| 5,551,145 A | | 9/1996 | Jurgenson ................ | 29/603.03 |
| 5,608,592 A | | 3/1997 | Mizoshita et al. .......... | 360/105 |
| 5,701,216 A | * | 12/1997 | Yamamoto et al. ........ | 360/96.5 |
| 5,751,514 A | * | 5/1998 | Hyde et al. .............. | 360/97.01 |
| 5,809,520 A | | 9/1998 | Edwards et al. ............ | 711/115 |
| 5,870,248 A | | 2/1999 | Akutsu et al. ........... | 360/99.04 |
| 5,940,245 A | * | 8/1999 | Sasaki et al. ............ | 360/99.06 |
| 6,175,468 B1 | * | 1/2001 | Koizumi et al. .............. | 360/94 |

FOREIGN PATENT DOCUMENTS

| | | |
|---|---|---|
| EP | 0 788 103 A2 | 8/1997 |
| JP | 62-256295 | 11/1987 |
| JP | 3-30007 | 2/1991 |
| JP | 4-30367 | 2/1992 |
| JP | 5-54565 | 3/1993 |
| JP | 5-181565 | 7/1993 |
| JP | 7-105673 | 4/1995 |
| JP | 7-176181 | 7/1995 |
| JP | 8-87872 | 4/1996 |
| JP | 9-180426 | 7/1997 |
| JP | 9-270161 | 10/1997 |
| WO | WO 93/10535 | 5/1993 |

* cited by examiner

*Primary Examiner*—Brian E. Miller
(74) *Attorney, Agent, or Firm*—Woodcock Washburn LLP (57) ABSTRACT

A disk drive motor (5) for driving and rotating a recording medium (disk), a head (57) for recording or playing back information to/from this disk, and a head drive mechanism for driving the head, are disposed inside a case body (15, 16) of the magnetic recording unit. A lid body (17) to close the cartridge insertion slot (18) is disposed the case body (15, 16) at a position facing the cartridge insertion slot (18). When the lid body (17) falls down the front side and the cartridge insertion slot (18) is opened, the top face of the lid body (17) becomes substantially on the same plane as the top face of the frame plate where the disk drive motor (5) and the head (17) drive mechanism are mounted.

15 Claims, 6 Drawing Sheets

MAGNETIC RECORDING UNIT WITH LID

CROSS-REFERENCE TO RELATED APPLICATIONS

This application is the U.S. National Phase of International Application No. PCT/JP99/01414 filed Mar. 19, 1999, which claims priority to Japanese patent application Nos. 71589/1998 filed Mar. 20, 1998 and 343644/1998 filed Nov. 18, 1998, incorporated herein by reference.

BACKGROUND OF THE INVENTION

1. Field of the Invention

The present invention relates to an improvement of a magnetic recording unit where such a recording medium as a disk is housed in a cartridge so as to attach to such an information equipment as a portable computer.

2. Description of the Related Art

A card type magnetic recording unit, such as a PC card, is attached to portable information equipment, such as a portable compact computer, so that the portable information equipment reads information from the magnetic recording medium of the magnetic recording unit or writes information to the magnetic medium.

However, most of the card type magnetic recording units use a semiconductor memory for the recording medium, which is expensive and has small recording capacity.

To provide an inexpensive and portable recording unit, a card type recording unit, to which a cartridge housing a disk type recording medium is set, was developed so that the information stored on the recording medium (disk) is read by the head and is output to a computer or information from a computer is written to the disk by the head.

Such a magnetic recording unit, however, does not have a lid over a slot for inserting the cartridge housing the recording medium (disk). Therefore, a foreign substance enters into the magnetic recording unit through this slot, causing a functional failure to the card type magnetic recording unit.

SUMMARY OF THE INVENTION

It is an object of the present invention to provide a magnetic recording unit which does not allow a foreign substance to enter through the cartridge slot of the magnetic recording unit when the magnetic recording unit is not housing a cartridge.

To achieve the above object, a magnetic recording unit in accordance with the present invention comprises: a case body having a cartridge insertion slot so as to insert a cartridge housing a disk, which is a recording medium, to inside the case body through the cartridge insertion slot; and a disk drive motor for driving and rotating the disk, a head for recording or playing back information to/from this disk, and a head drive mechanism for driving the head, which are disposed inside the case body, wherein a lid body to close the cartridge insertion slot is disposed on the cases body or on a support element mounted to the case body at a location facing the cartridge insertion slot.

Since the lid body is disposed at the cartridge insertion slot of the magnetic recording unit, the present invention can prevent a foreign substance from entering the magnetic recording unit in a state when a cartridge is not loaded. As a consequence, a magnetic recording unit which has high reliability and good portability can be provided.

Also the lid body is structured so as to support the inner walls at the top and body of the case body, therefore deformation of the magnetic recording unit can be prevented even if an external force is exerted on the unit in the thickness direction, and as a result, a magnetic recording unit which has high safety can be provided.

Also a lid body housing section for housing the lid body is disposed, by which the top face of the lid body and the top face of the frame plate become on the same plane, therefore the cartridge is guided by the top face of the lid body and the top face of the frame plate, so that the cartridge is loaded smoothly into the unit.

DESCRIPTION OF THE PREFERRED EMBODIMENTS

Figure 1:
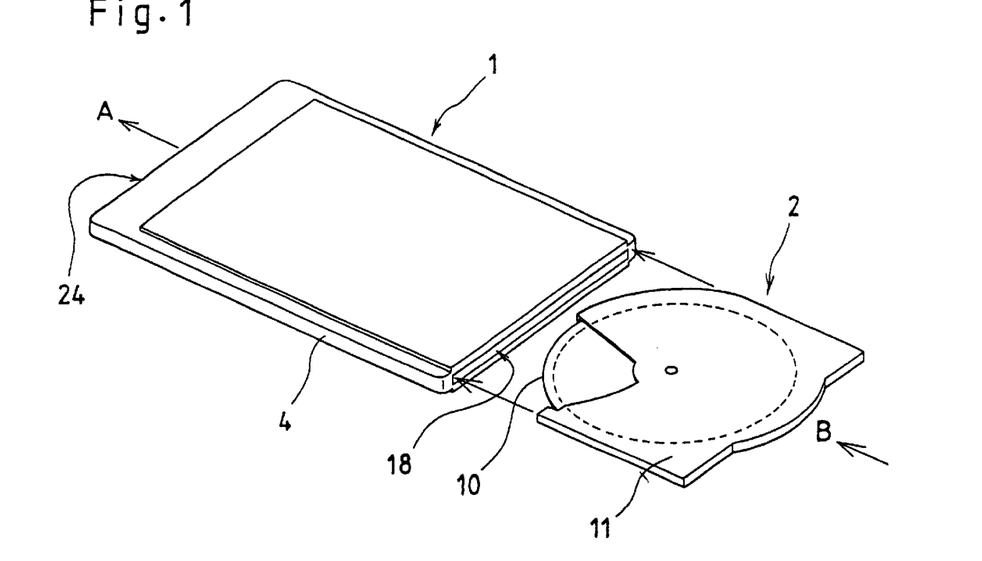
FIG. 1 is a perspective view viewed diagonally from the top depicting a magnetic recording unit and a cartridge of an embodiment in accordance with the present invention.

An overview of the magnetic recording unit 1 and the cartridge 2, which is set to the magnetic recording unit 1 or ejected thereof, will be explained with reference to FIG. 1.

The magnetic recording unit 1 is covered with a case body which is formed in a card shape having external dimensions conforming to the PCMCIA (Personal Computer Memory Card International Association) type II standard. The case body has a space to house the cartridge 2 inside, and encloses a mechanism section (described later) comprising of a motor for driving the disk, a playback/record head, a motor for driving the playback/record head, and a circuit board (not illustrated) for controlling these motors.

At the front end part of the case body, a connector 24 for attaching the magnetic recording unit to the computer main body is exposed. At the rear end part of the case body, a cartridge insertion slot 18 for inserting the cartridge 2 into the magnetic recording unit 1 is formed.

The cartridge 2 comprises a disk case 11 and a disk 10 which is housed in the disk case 11 and is a recording medium rotatably supported by the disk case 11.

The connector 24 is connected to the slot on an information equipment such as a computer (not illustrated) by moving the magnetic recording unit 1 in the arrow A direction. The cartridge 2 is set inside the magnetic recording unit 1 through the cartridge insertion slot 18 by moving the cartridge 2 in the arrow B direction.

Now an overview of the magnetic recording unit 1 will be explained with reference to FIG. 2 and FIG. 3.

Figure 2:
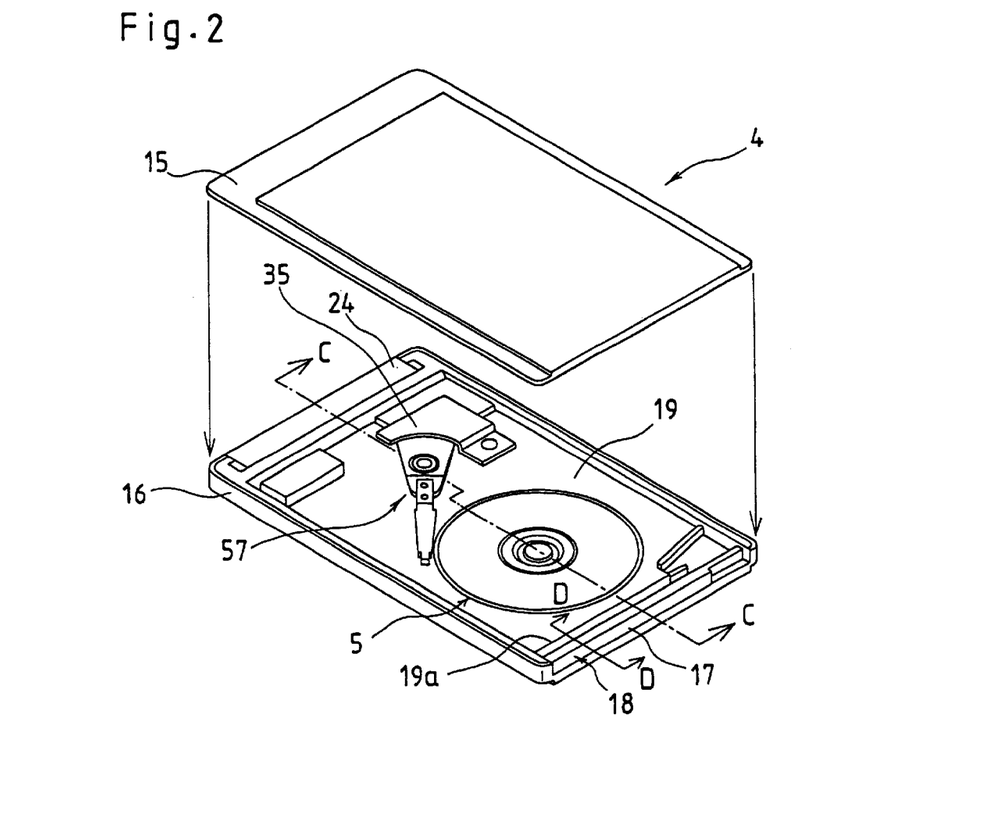
FIG. 2 is an explanatory drawing depicting the state where the top cover the magnetic recording unit in FIG. 1 is removed.
Figure 3:
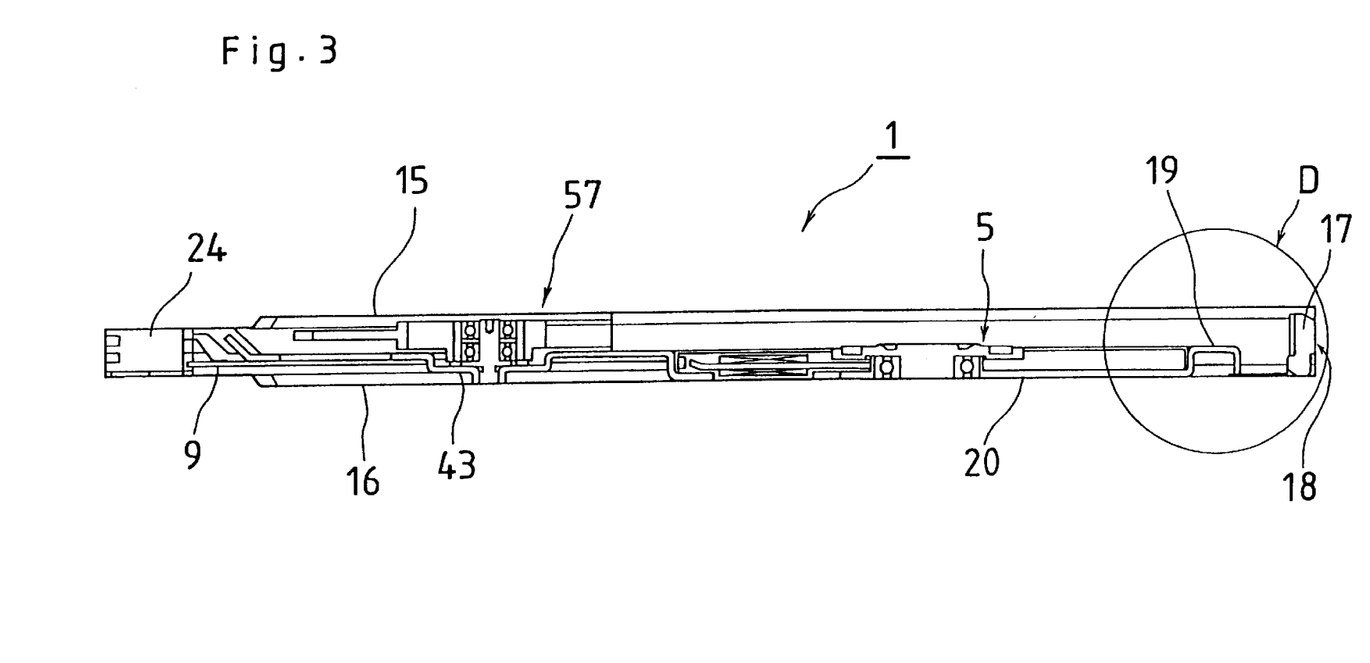
FIG. 3 is a cross-sectional view depicting the C—C cross-section in FIG. 2 (top cover is removed)

The case body comprises a bottom cover 16 and a top cover 15, as shown in FIG. 2. A frame plate 19 is disposed roughly at the center in the height direction of the space between the bottom cover 16 and the top cover 15. The connector 24 is attached to the front end of the frame plate 19. The disk drive motor 5, the record/playback head body 57 and the head motor for driving the record/playback head are mounted on the top face side of the frame plate 19. On the bottom face side of the frame plate 19, on the other hand, the circuit board having control circuits (not illustrated) is mounted.

The frame plate 19 is made of non-magnetic material, stainless steel having non-magnetic properties for example. On the frame plate 19, as shown in FIG. 3, a first mounting concave section 20 and a second mounting concave section 43 are formed by drawing processing respectively. In the frame plate 19, the first mounting concave section 20 is formed at a position where the disk drive motor 5 is mounted as shown in FIG. 2, and the second mounting concave section 43 is formed at the area where the record/playback head body 57 is mounted, also as shown in FIG. 2. Using the first mounting concave section 20 and the second mounting concave section 43, the disk drive motor 5 and the record/playback head body 57 (head drive motor) are installed, whose details are explained later.

The lid body 17 for opening/closing the cartridge insertion slot 18 is installed inside the case body at a position near the cartridge insertion slot 18. The lid body 17, as shown in FIG. 2, is an element having a rectangular shape which stretches in the width direction of the case body when its cross-section is viewed. The structure of the lid 17 will now be described with reference to FIG. 4 to FIG. 7.

Figure 6:
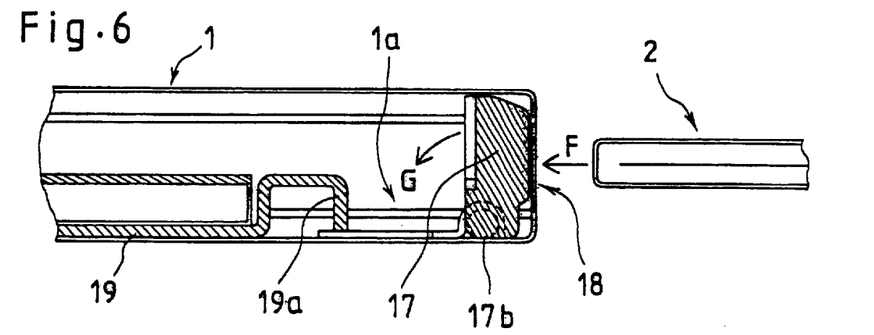
FIG. 6 is a partially enlarged sectional view where the D portion in FIG. 3 is enlarged.
Figure 7:
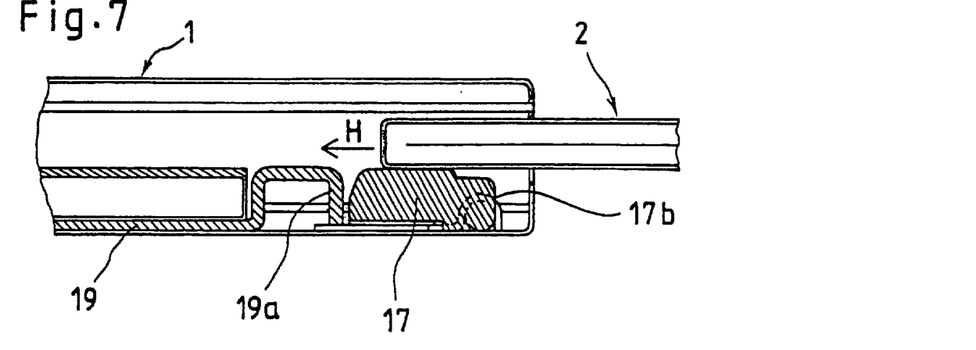
FIG. 7 is an explanatory drawing depicting the state where the edge of the cartridge is loaded in the magnetic recording unit shown in FIG. 6.

The base 17*b* of the lid body 17 is formed to be flat (see FIG. 6 and FIG. 7). On the face of the lid body 17 which faces the inside of the case body, a rotational shaft 17*a* of which axis is in the longitudinal direction of the lid body 17 is attached at two locations near the base 1 7*b*, at the left and right.

Figure 4:
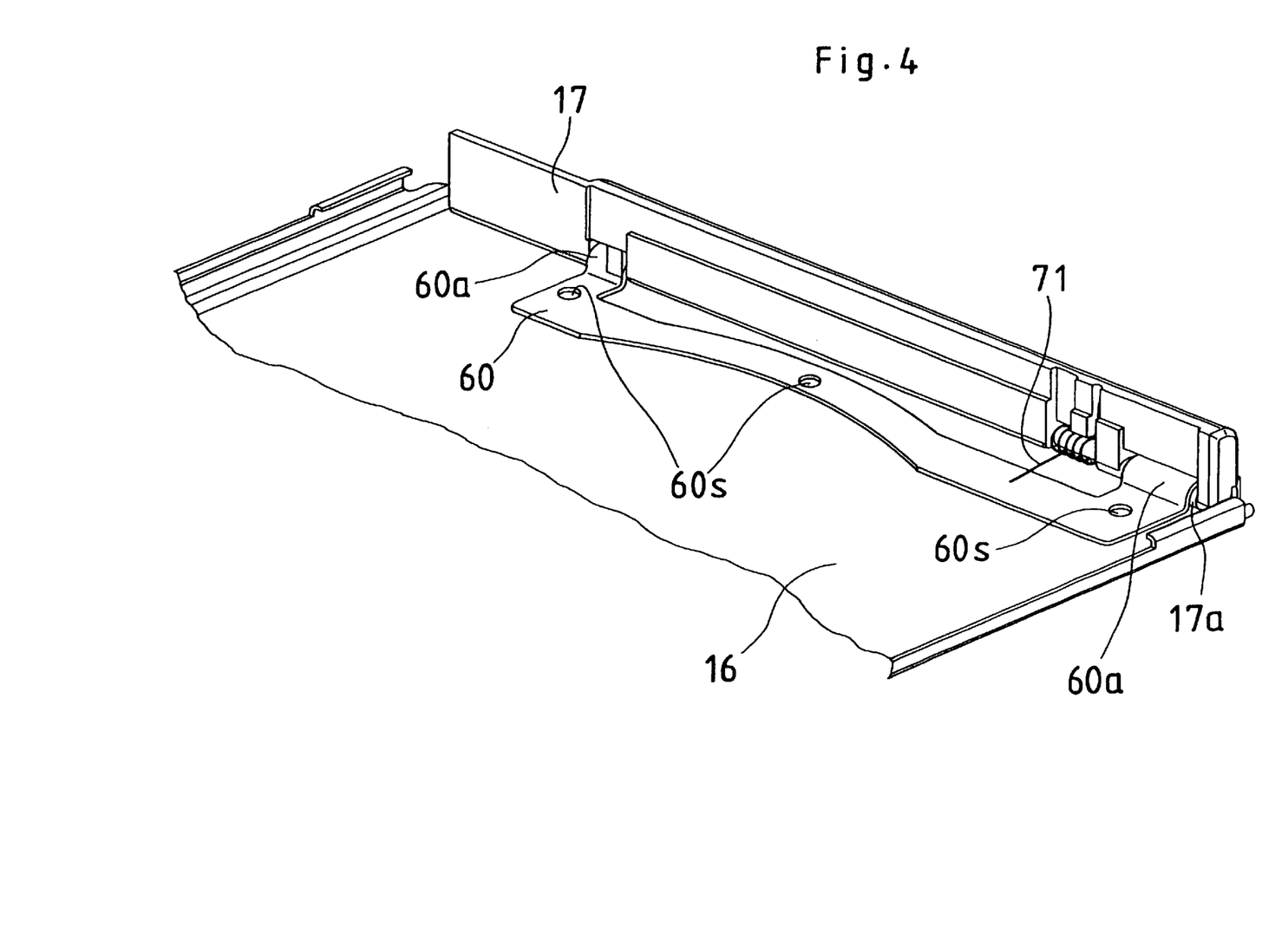
FIG. 4 is a drawing depicting details of the area around the cartridge insertion slot when the top cover and the frame plate are removed from the magnetic recording unit shown in FIG. 2.
Figure 5:
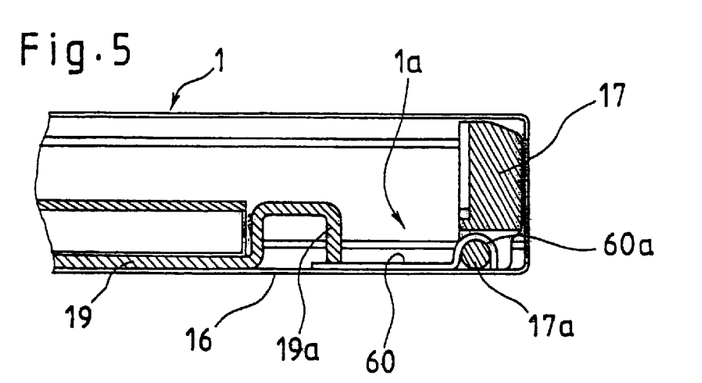
FIG. 5 is a cross-sectional view depicting the D—D cross-section in FIG. 2 (top cover is attached)

On the edge, at the side of the cartridge insertion slot 18, of the bottom cover 16 constituting the case body, as shown in FIG. 4, the plate shaped lid body support element 60 is joined by spot welding. The sign 60*s* in FIG. 4 denotes the spot welded locations. Both ends of the lid body support element 60 are extended toward the cartridge insertion slot 18, and the tips are bent and raised, forming the lid body support sections 60*a* to receive the rotation shaft 17*a* of the lid 17.

Therefore, if the rotation shaft 17*a* of the lid body 17 is inter-fitted in the lid body support sections 60*a* of the lid body support element 60, the lid body 17 can rotate around the rotation shaft 17*a* so as to tilt toward the inside of the case body.

The lid body 17, where rotation shafts 17*a* at the left and right are supported by the lid body support sections 60*a* of the lid body support element 60, is constantly receiving force in the direction to close the cartridge insertion slot 18 by a spring 71 for exerting force. The lid body 17 receiving force by the spring 71 contacts, along its entire width, the top and bottom inner walls of the cartridge insertion slot 18 of the case body, and as a result, a state closing the cartridge insertion slot 18 is maintained.

If a bending force in the width direction is exerted on the magnetic recording unit 1 (or on the case body) when the lid body 17 covers the cartridge insertion slot 18 by the force exerted by the spring 71, the lid body 17 supports the top and bottom inner walls of the case body. Since the base 17*b* of the lid body 17 is flat, the lid body 17 can support the top and bottom inner walls of the case body without rotating, even if an external force is exerted from outside the case body. Therefore, the magnetic recording unit 1 having a lid body so as to face the cartridge insertion slot 18 is resistant to bending in the left and right directions.

The edge of the frame plate 19 at the cartridge insertion slot 18 side is between the first mounting concave section 20 and the cartridge insertion slot 18, and is bent toward the bottom cover 16. Since the frame plate 19 has this section bent toward the bottom cover 16 (frame plate bent section 19*a*), resistance to bending in the width direction is increased.

A lid body housing section 1*a* occupies the area ranging from the frame plate bent section 19*a* to the cartridge insertion slot 18.

When the cartridge 2 is moved to the arrow F direction, as shown in FIG. 6, and the tip of the cartridge 2 pushes the lid body 17, the lid body 17 is pushed down inside the case, resisting the force exerted by the spring 71, that is, the lid body 17 rotates in the arrow G direction. If the cartridge 2 is pushed more in the arrow F direction, the lid body 17 rotates 90 degrees from the position closing the cartridge insertion slot 18, and is housed in the lid body housing section 1*a* as shown in FIG. 7.

The thickness of the lid body 17 is determined such that when the lid body 17 is housed in the lid body housing section 1*a*, the top face of the lid body 17 (that is, the external face of the lid body 17 which closes the cartridge insertion slot 18) and the top face of the frame plate 19 become substantially on the same plane.

Therefore, if the cartridge 2 is pushed further from the position in FIG. 7 toward the inside of the magnetic recording unit 1 (in the arrow H direction), the cartridge 2 is moved while being guided by the top face of the lid body 17 and the top face of the frame plate 19, reaching a predetermined position in the magnetic recording unit 1, engaging with the ejector mechanism (not illustrated). In this way, the rear part of the cartridge 2 which is set in the magnetic recording unit 1 is on the lid body 17 housed in the lid body housing section 1*a*.

If the cartridge 2 set in the magnetic recording unit 1 is pulled out, the lid body 17 housed in the lid body housing section 1*a* rises by the force exerted by the spring element, and closes the cartridge insertion slot 18. The state where the lid body 17 closes the cartridge insertion slot 18 is maintained by the force exerted by the spring element.

Figure 8:
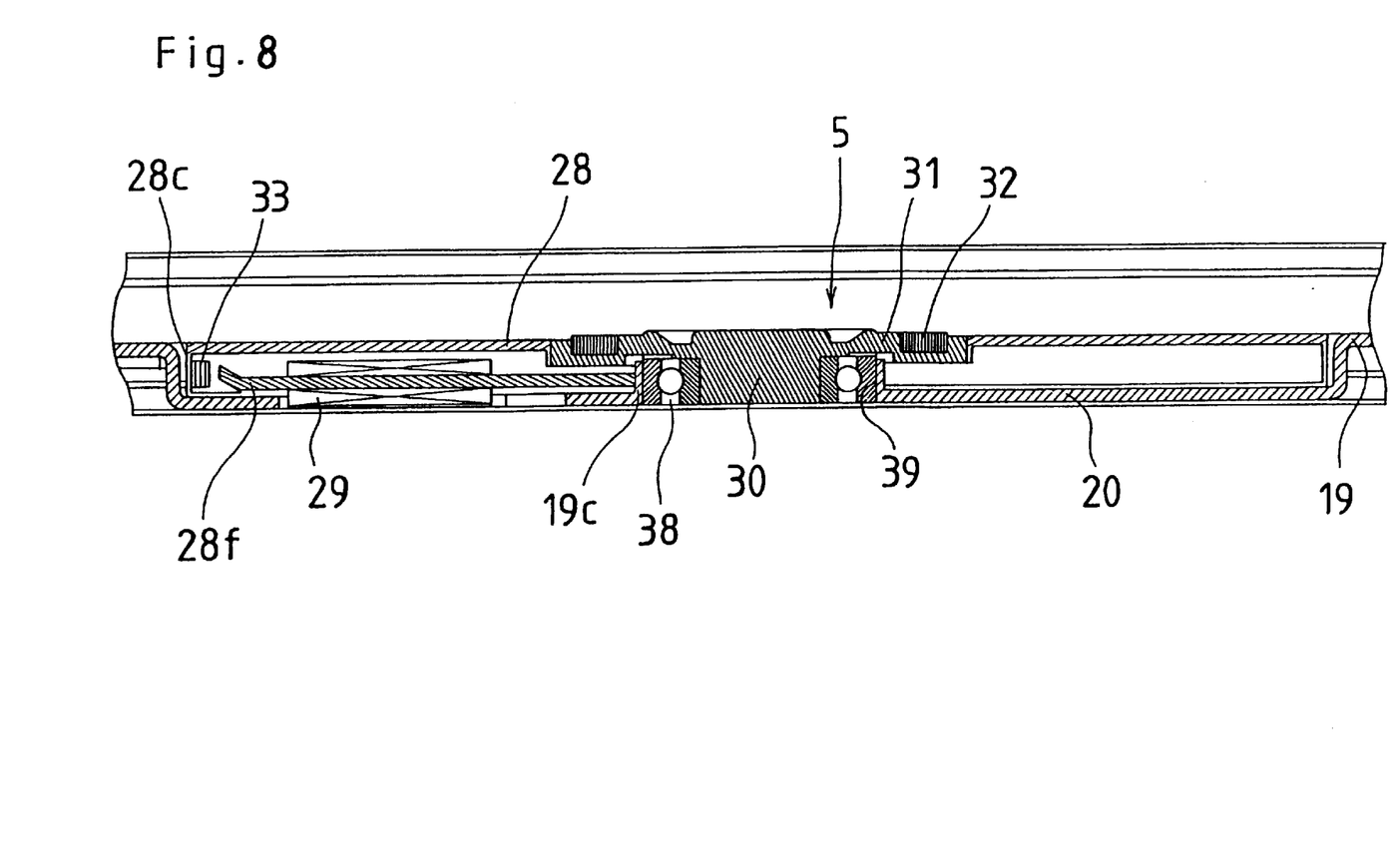
FIG. 8 is a partially enlarged sectional view where the portion related to the disk driving motor in the cross-sectional view shown in FIG. 3 is enlarged.

Next, mounting the disk drive motor at the first mounting concave section 20 formed in the frame plate 19 will be explained with reference to FIG. 8.

The first mounting concave section 20 formed by drawing processing has the shape of a shallow cup with a circular cross-section. At the base of the first mounting concave section 20, a disk drive motor mounting section 19*c* is formed around the opening 39 formed at the center by drawing processing in a direction opposite from the drawing direction of the first mounting concave section 20.

The motor bearing 38 is inter-fitted inside the disk drive motor mounting section 19*c*, and the rotor shaft 30 is inter-fitted inside the motor bearing 38. The mounting base 31 for mounting the disk 10 is formed on the rotor shaft 30, and a rotor 28 and a disk attraction magnet 32 are secured on the mounting base 31.

The rotor 28 has a shallow cup shape with a circular cross-section. The opening of this cup faces the base of the first mounting concave section 20. On the wall surrounding the rotor 28, a plurality of rotor magnets 33 are fixed at equal intervals in the circumference direction. The top face of the rotor 28 and the top face of the frame plate 19 are substantially on the same plane. The top face of the disk attraction magnets 32 is slightly higher than the top face of the rotor 28.

A yoke element 28f, which has a plurality of arms arranged radially, is inter-fitted in the disk drive motor mounting section 19c. This yoke element 28f is made of magnetic material and is secured at the first mounting concave section 20. A stater coil 29 is coiled on each arm. The tips of the arms, where the stator coil 29 is coiled closely, face the rotor magnets 33 of the rotor 28. The stater coil 29 is connected to the control circuit, which is formed on the circuit board disposed at the bottom face of the frame plate 19, and is driven by the control circuit.

The disk drive motor is comprised of the rotor 28 where the rotor magnets 33 are secured, and the yoke element where the stater coil 29 is coiled on the arms, as explained above.

Figure 9:
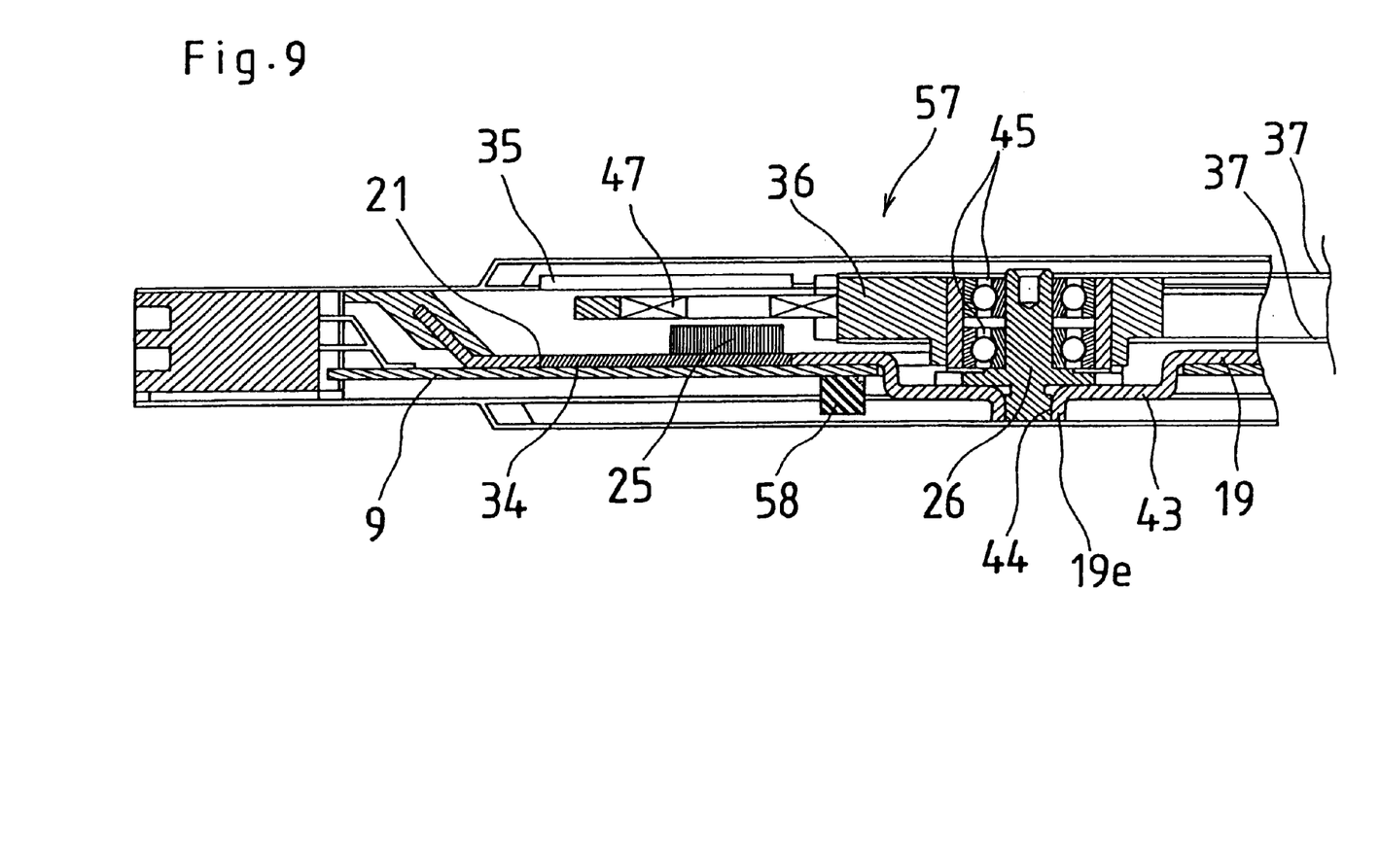
FIG. 9 is a partially enlarged sectional view where the portion related to the record/playback head in the cross-sectional view shown in FIG. 3 is enlarged.

Next, mounting the record/playback head body 57 and the head drive motor for driving the record/playback head body 57 at the second mounting concave section 43 formed on the frame plate 19 will be explained with reference to FIG. 9.

The second mounting concave section 43 formed by drawing processing has a shallow cup shape with a circular cross-section. Furthermore, the head drive motor installation section 19e is formed at the center in the base of the second mounting concave section 43 by drawing processing, in the same direction as the drawing direction of the second mounting concave section 43.

The head shaft 26 is inter-fitted in the head drive motor mounting section 19e. On the head shaft 26, two head bearings 45 are inter-fitted. A head substrate 36, which is the substrate of the record/playback head body 57, is secured outside the two head bearings 45.

A head arm 37 and a head moving coil 47 are secured on the head substrate 36. The head arm 37 is formed as a long arm shape made of a thin plate, and the record/playback head (not illustrated) is mounted at the tip. This record/playback head faces the recording face of the disk 10 housed in the cartridge 2.

A roughly arc shaped opening 21 is formed in the frame plate 19 at the area facing the head moving coil 47. The center of the arc of the opening 21 is the center of the head shaft 26. The bottom yoke 34 is inter-fitted in this opening 21. This bottom yoke 34 is made of magnetic material, and its shape is the same as the shape (arc) of the opening 21, and the thickness is the same as the thickness of the frame plate 19. Therefore the thickness of the magnetic recording unit can be decreased by the thickness of the bottom yoke 34, compared with the case when the bottom yoke 34 is secured on top of the frame plate 19.

The head drive magnet 25 is secured on the bottom yoke 34 closely facing the bottom face of the head moving coil 47. The top yoke 35 is mounted on the frame plate 19 closely facing the top face of the head moving coil 47 (see FIG. 2). This top yoke 35 and bottom yoke 34 jointly create a magnetic field at the position of the head moving coil 47.

The head moving coil 47 is connected to the control circuit which is disposed on the circuit board at the bottom face side of the frame plate 19, and current is supplied to the head moving coil 47 by this control circuit.

The head drive motor is comprised of the top yoke 35, the bottom yoke 34, the head drive magnet 25, and the head moving coil 47, as explained above.

And as explained above, the top yoke 35, the bottom yoke 34 and the head drive magnet 25 generate a magnetic field at the position of the head moving coil 47 which generates a driving force in the head moving coil 47. By this drive force, the record/playback head (not illustrated) mounted on the head arm 37 can move in roughly a radial direction on the recording face of the disk 10, and can record/playback information to/from the disk 10.

What is claimed is:

1. A magnetic recording unit comprising:
    a case body comprising a top cover and a bottom cover, said top cover comprising a top inner wall, and said bottom cover comprising a bottom inner wall, said case body further comprising a front end and a rear end;
    a cartridge insertion slot at said rear end to accept a cartridge that is inserted through said slot into said case body, wherein said cartridge comprises a data storage medium;
    a lid body disposed within said case body at a location facing said cartridge insertion slot to close said slot, said lid body having a top portion, a base portion, an inside face, and an external face; wherein said top portion supports said top inner wall and said base portion supports said bottom inner wall of said case body, whereby said lid body prevents deformation of said case body; and
    a frame plate disposed within said case body and contacting said case body, whereby said frame plate prevents deformation of said case body.

2. The magnetic recording unit according to claim 1, wherein said lid body closes said cartridge insertion slot from inside said case body using a force exerted by a spring element.

3. The magnetic recording unit according to claim 2, wherein said lid body tilts inside and opens the cartridge insertion slot when an external force exceeding said force exerted by said spring element is applied through the cartridge insertion slot.

4. The magnetic recording unit according to claim 3, wherein a housing section for housing the lid body which has tilted down inside is formed in said case body at an area near the cartridge insertion slot, and when the lid body which has tilted down by the cartridge insertion operation is housed in said housing section, the cartridge passing through the cartridge insertion slot is guided on an outer portion of said lid body.

5. The magnetic recording unit according to claim 3, wherein the axis about which said lid body rotates exists near a ridge line of the lid body between said inside face and said base portion which comes into contact with said bottom inner wall when the lid body closes the cartridge insertion slot.

6. The magnetic recording unit according to claim 5, wherein said case body further comprises a support element mounted on either said top inner wall or said bottom inner wall.

7. The magnetic recording unit according to claim 1, wherein said lid body contacts an entire width of said top inner wall and said bottom inner wall of said case body at an area around said cartridge insertion slot, when said cartridge insertion slot is closed.

8. The magnetic recording unit according to claim 7, wherein said base portion of said lid body is formed to be flat, said base portion contacts said bottom inner wall when the cartridge insertion slot is closed.

9. The magnetic recording unit of claim 1, wherein said lid body is disposed on a support element mounted to said case body.

10. The magnetic recording unit according to claim 9, wherein said lid body is rotatably supported by the support element mounted in said case body.

11. The magnetic recording unit according to claim 10, wherein said lid body has a rotation shaft, and said support element has a rotation shaft support section which holds and rotatably supports said rotation shaft.

12. The magnetic recording unit of claim 1, further comprising a disk drive motor for driving and rotation said disk, a head for recording or playing back information to/from said disk, and a head drive mechanism for driving said head, which are disposed inside the case body.

13. The magnetic recording unit of claim 1, further comprising an edge of said frame plate bent toward said bottom cover.

14. A magnetic recording unit comprising:
- a case body having a cartridge insertion slot so as to insert a cartridge housing a disk, which is a recording medium, to inside the case body through said cartridge insertion slot; and
- a disk drive motor for driving and rotation said disk, a head for recording or playing back information to/from said disk, and a head drive mechanism for driving said head, which are disposed inside the case body,
- a lid body to close said cartridge insertion slot disposed on the case body or on a support element mounted to said case body at a location facing said cartridge insertion slot;
- wherein said lid body closes said cartridge insertion slot from inside said case body using a force exerted by a spring element, and wherein said lid body tilts inside and opens the cartridge insertion slot when an external force exceeding said force exerted by said spring element is applied through the cartridge insertion slot; and wherein said disk drive motor and head drive mechanism are mounted using respective concave sections formed on a frame plate, and when the lid body which has tilted down by the cartridge insertion operation is housed in the housing section, the top face of the lid body and the top face of said frame plate are substantially on the same plane where said concave sections are not formed.

15. A magnetic recording unit comprising:
- a case body having a cartridge insertion slot so as to insert a cartridge housing a disk, which is a recording medium, to inside the case body through said cartridge insertion slot; and
- a disk drive motor for driving and rotation said disk, a head for recording or playing back information to/from said disk, and a head drive mechanism for driving said head, which are disposed inside the case body,
- a lid body to close said cartridge insertion slot disposed on a support element mounted to said case body at a location facing said cartridge insertion slot;
- wherein said case body further comprises a top cover and a bottom cover, and said support element is mounted on either the top cover or the bottom cover;
- wherein said lid body closes said cartridge insertion slot from inside said case body using a force exerted by a spring element, and wherein said lid body tilts inside and opens the cartridge insertion slot when an external force exceeding said force exerted by said spring element is applied through the cartridge insertion slot;
- wherein an axis about which said lid body rotates exists near a ridge line of the lid body between a face of the lid body which faces the inside of the case body and a face of the lid body which comes into contact with the bottom cover when the lid body closes the cartridge insertion slot;
- wherein both ends of said support element mounted on either the top cover or the bottom cover extend toward the cartridge insertion slot, and tips of the support element are bent and raised, forming the rotation shaft support section.

\* \* \* \* \*

UNITED STATES PATENT AND TRADEMARK OFFICE
CERTIFICATE OF CORRECTION

PATENT NO.   : 6,738,221 B1
DATED        : May 18, 2004
INVENTOR(S)  : Katsutoshi Makaijima, Maki Wakita and Shoji Takahashi It is certified that error appears in the above-identified patent and that said Letters Patent is hereby corrected as shown below:

<u>Title page,</u>
Item [73], Assignee, after "Iomega Corporation, San Diego, CA" please insert -- and Citizen's Watch Co., Ltd., Tokyo, Japan --

Signed and Sealed this

Thirteenth Day of July, 2004

JON W. DUDAS
*Acting Director of the United States Patent and Trademark Office*